(12) United States Patent
Tong et al.

(10) Patent No.: US 8,736,564 B2
(45) Date of Patent: May 27, 2014

(54) PROXIMITY DETECTION BETWEEN A MOBILE DEVICE AND A RELATED OBJECT

(75) Inventors: Kuo-Feng Tong, Waterloo (CA); Devin Jay Kaiser, Kitchener (CA)

(73) Assignee: BlackBerry Limited, Waterloo (CA)

( * ) Notice: Subject to any disclaimer, the term of this patent is extended or adjusted under 35 U.S.C. 154(b) by 378 days.

(21) Appl. No.: 13/115,743

(22) Filed: May 25, 2011

(65) Prior Publication Data

US 2012/0299864 A1 Nov. 29, 2012

(51) Int. Cl.
*G06F 3/041* (2006.01)

(52) U.S. Cl.
USPC ........................................................ 345/173

(58) Field of Classification Search
None
See application file for complete search history.

(56) References Cited

U.S. PATENT DOCUMENTS

| | | | |
|---|---|---|---|
| 7,085,542 B2 | 8/2006 | Dietrich et al. | |
| 7,231,226 B2 | 6/2007 | Vander Veen et al. | |
| 7,454,239 B2 | 11/2008 | Infanti | |
| 7,519,388 B2 | 4/2009 | Vander Veen et al. | |
| 7,555,326 B2 | 6/2009 | Infanti | |
| 7,653,883 B2 | 1/2010 | Hotelling et al. | |
| 2006/0208857 A1 | 9/2006 | Wong | |
| 2007/0099574 A1 | 5/2007 | Wang | |
| 2007/0161410 A1 | 7/2007 | Huang | |
| 2008/0012706 A1 | 1/2008 | Mak-Fan et al. | |
| 2008/0191892 A1 | 8/2008 | Kirkup et al. | |
| 2009/0002217 A1* | 1/2009 | Kryze et al. | 341/176 |
| 2009/0096749 A1* | 4/2009 | Kawahara et al. | 345/162 |

FOREIGN PATENT DOCUMENTS

| WO | 0159558 A1 | 8/2001 |
|---|---|---|
| WO | 2008147674 A1 | 12/2008 |

* cited by examiner

*Primary Examiner* — Adam R Giesy
(74) *Attorney, Agent, or Firm* — MBM Intellectual Property Law, LLP

(57) ABSTRACT

Methods and apparatus are provided related to proximity detection between a mobile device and a related object, such as a holder, holster, pocket liner, support surface, or the like. A pattern is associated with the related object or device, for example printed on a surface thereof, the pattern being discernable by a mobile device input module, such as a touch surface or optical navigation module. When the pattern is presented to the input module, the mobile device detects the pattern and may respond accordingly, for example by shifting to a standby mode or suppressing mobile device inputs.

21 Claims, 8 Drawing Sheets

PROXIMITY DETECTION BETWEEN A MOBILE DEVICE AND A RELATED OBJECT

CROSS-REFERENCE TO RELATED APPLICATIONS

This is the first application filed for the present technology.

TECHNICAL FIELD

The present disclosure relates generally to mobile electronic devices and, in particular, to methods and apparatus facilitating proximity detection between a mobile device and a related object, such as a holder, container, holster, support surface, or the like.

BACKGROUND

Mobile devices, such as hand-held electronic devices, wireless communication devices, and the like, are often suited for placement in a holster, such as a belt-mounted holster, or other holder, carry case, or the like. Typically, the mobile device will be placed in its holster when not in use, for example in order to protect and conveniently transport the device.

It is often desirable to automatically detect when the mobile device is holstered, and to alter operating conditions of the mobile device upon such detection. For example, input components such as keyboards, touch screens, and the like can be disabled when the mobile device is holstered, to avoid inadvertent key presses, which may cause undesired activation of mobile device functions, undesired settings changes, increased battery drain, and other problems.

Various solutions to this problem have been proposed, for example by adding a magnet and magnetic sensor to the holster and device, respectively, in order to trigger the mobile device into a standby mode upon detection of the holster magnet. Another solution proposes to add an RFID tag and RFID sensor to the holster and device for similar purposes. However, such solutions require additional hardware to be incorporated into the mobile device, which may increase device complexity, costs, and power requirements.

Therefore there is a need for a method and apparatus for facilitating proximity detection between a mobile device and a related object that overcomes one or more problems in the art.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
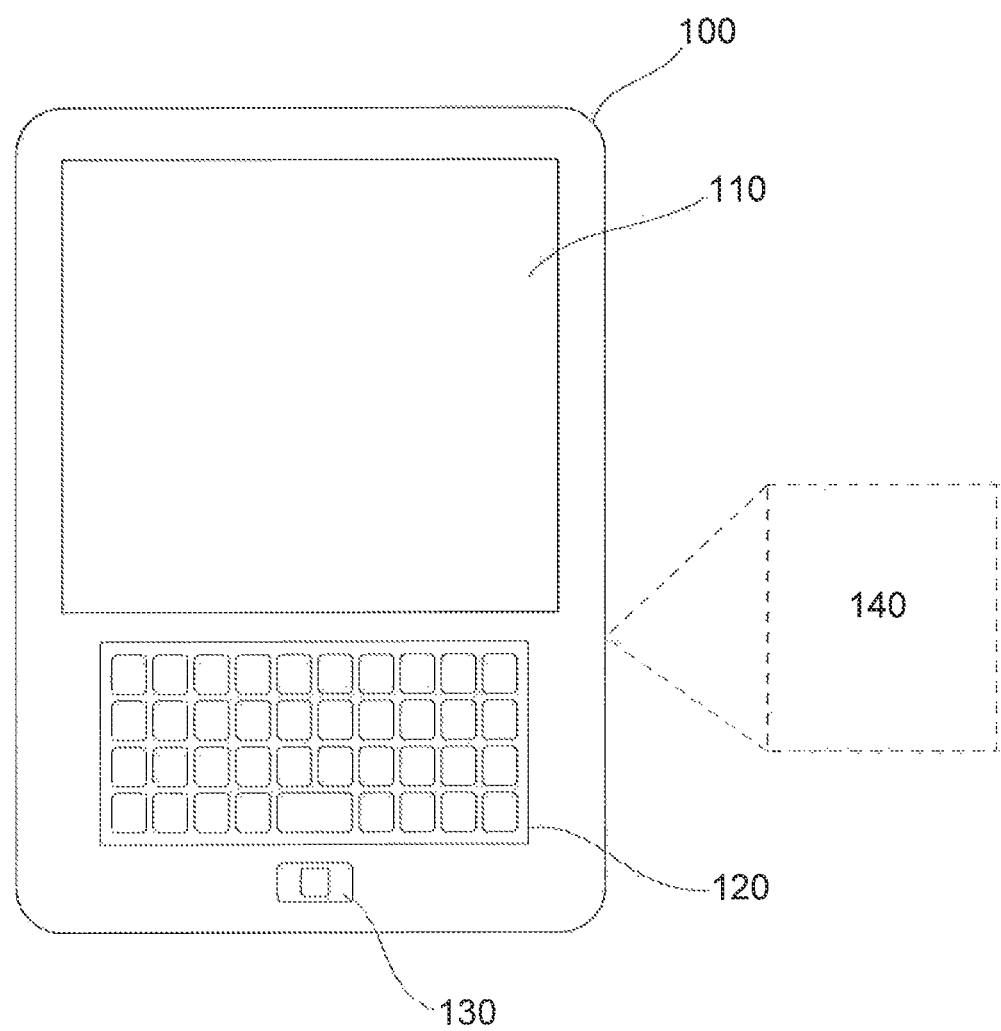
FIG. 1 illustrates a mobile device in accordance with an exemplary embodiment of the present technology.

The present technology generally provides an apparatus, method and computer program product for facilitating proximity detection between a mobile device and a related object or device. The related object or device may be, for example, a holder, container, holster, pocket, case, or the like, into which the mobile device may be inserted for transportation and/or storage, a support surface upon which the mobile device may be placed, or the like.

Accordingly, an aspect of the present technology provides a mobile device comprising an input module and a pattern detection module in operative association. The input module is configured to discern input presented thereto and to produce signals indicative thereof. Examples of input modules include touchscreens, cameras, optical navigation modules, buttons, keypads, and other input devices associated with a mobile device. Input to the input module may include both input corresponding to active usage of the mobile device and input corresponding to a pattern presented by a predetermined object when the input module is proximately exposed to that pattern. Input corresponding to active usage may be, for example, input corresponding to a user's finger movements, stylus input, touches, button presses or the like. The pattern detection module is configured to detect occurrence of the aforementioned pattern being presented proximately to the input module, for example by processing information generated by the input module. The mobile device is configured to adjust an operating condition thereof based at least in part on detection of said pattern, for example to initiate a standby mode of the mobile device and/or to suspend, suppress, "lock" input modules of the mobile device, or the like.

Another aspect of the present technology provides an object or device for physical association with a mobile device. As previously mentioned, the object or device may be, for example, a holder, container, holster, pocket, case, or the like, into which the mobile device may be inserted, or a support surface upon which the mobile device may be placed, or the like. The object comprises a pattern capable of being discerned by an input module of the mobile device when the input module is proximately exposed to the pattern. The input module is also configured to receive input corresponding to active usage of the mobile device. The pattern is configured so as to be discernably different to the mobile device, relative to input corresponding to active usage. This facilitates detection of the pattern, and hence proximity of the object, by the mobile device.

Another aspect of the present technology provides a method of detecting proximity of an input module of a mobile device and a predetermined related object or device. The input module is also configured for receiving input corresponding to active usage of the mobile device. The method comprises processing information generated by the input module to detect a predetermined information pattern. The information pattern corresponds to a predetermined physical pattern being presented proximate to the input module, as interpreted by the input module. The physical pattern in turn is associated with the related object or device. The method further comprises adjusting an operating condition of the mobile device upon detection of said pattern.

Yet another aspect of the present technology provides a computer program product comprising code adapted to perform acts associated with the foregoing method when the code is loaded into memory and executed on a processor of a mobile device.

In accordance with embodiments of the present technology, a substantially standard or existing input module may be used for both active usage of the mobile device and for detecting and responding to predetermined patterns. Thus the capability to detect and respond to proximity of pattern indicative of the presence of a holder, surface, or the like, is provided without the need for additional sensors such as magnetic sensors or RFID sensors.

The details and particulars of these aspects of the technology will now be described below, by way of example, with reference to the attached drawings.

FIG. 1 illustrates a mobile device 100 in accordance with an exemplary embodiment of the present technology. The mobile device 100 comprises one or more input devices such as: a touch screen 110, a keypad 120, and an optical navigation module 130. The mobile device 100 further comprises interior electronics forming a pattern detection module 140 (represented by a broken line box to indicate that it is a functional component inside the mobile device), as well as electronics for facilitating other functionality of the mobile device 100. One or more of the input devices are configured to provide signals to the pattern detection module 140. The pattern detection module 140 is configured to detect a predetermined pattern and signal the mobile device 100 upon such detection.

Figure 2:
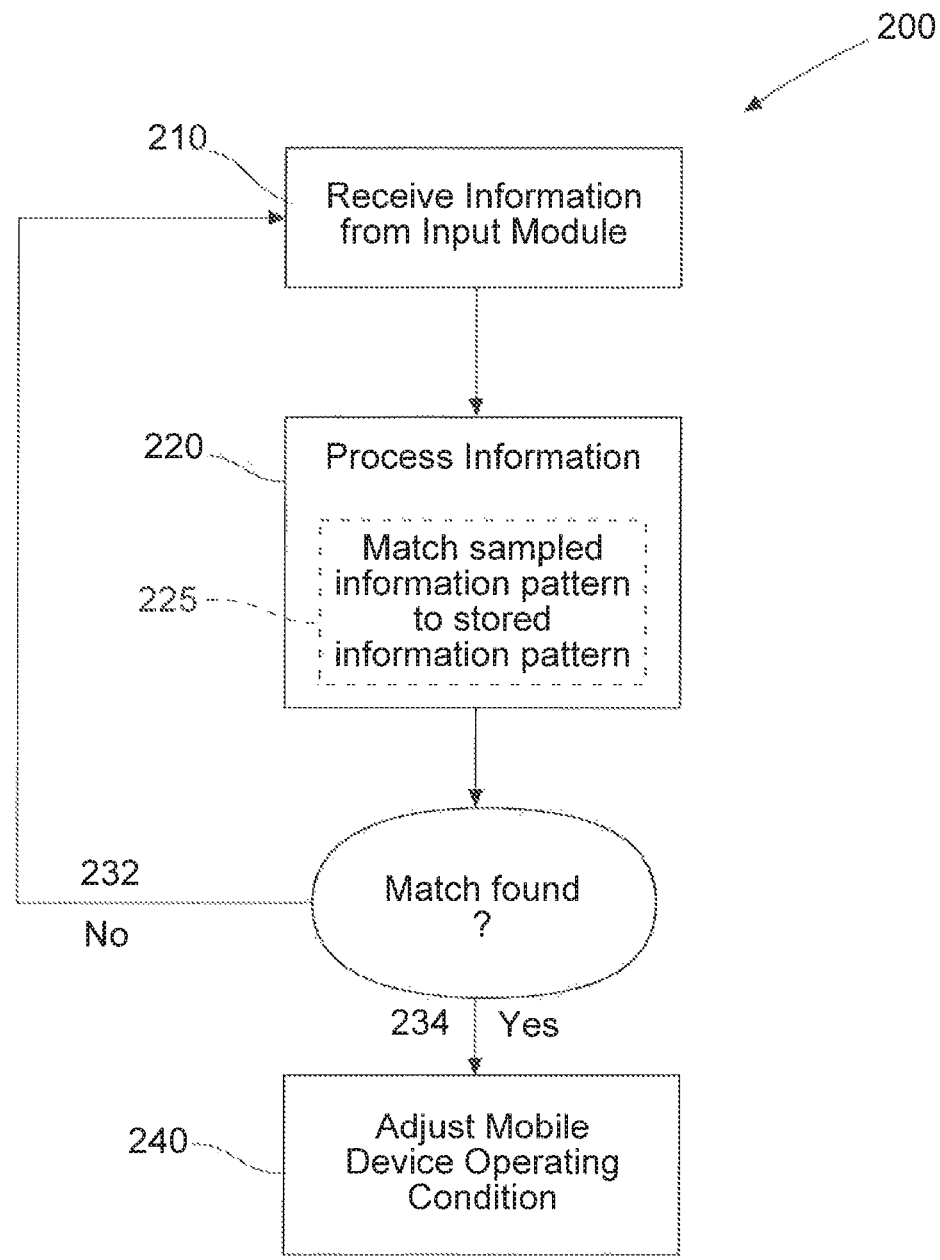
FIG. 2 illustrates a method in accordance with embodiments of the present technology.

FIG. 2 illustrates a method 200 of detecting proximity between a mobile device and a related, patterned object in accordance with embodiments of the present technology. The method 200 comprises receiving 210 information from an input module, for example information indicative of sampled data acquired by the input module. The method comprises processing 220 the information in order to detect a predetermined information pattern, which corresponds to a predetermined physical pattern presented to the input module. For example, the method may comprise matching 225 a sampled information pattern to a stored information pattern. If a match is not found 232, new information is received from the input module, possibly after a delay. If a match is found 234, the method 200 comprises adjusting 240 an operating condition of the mobile device.

Figure 3:
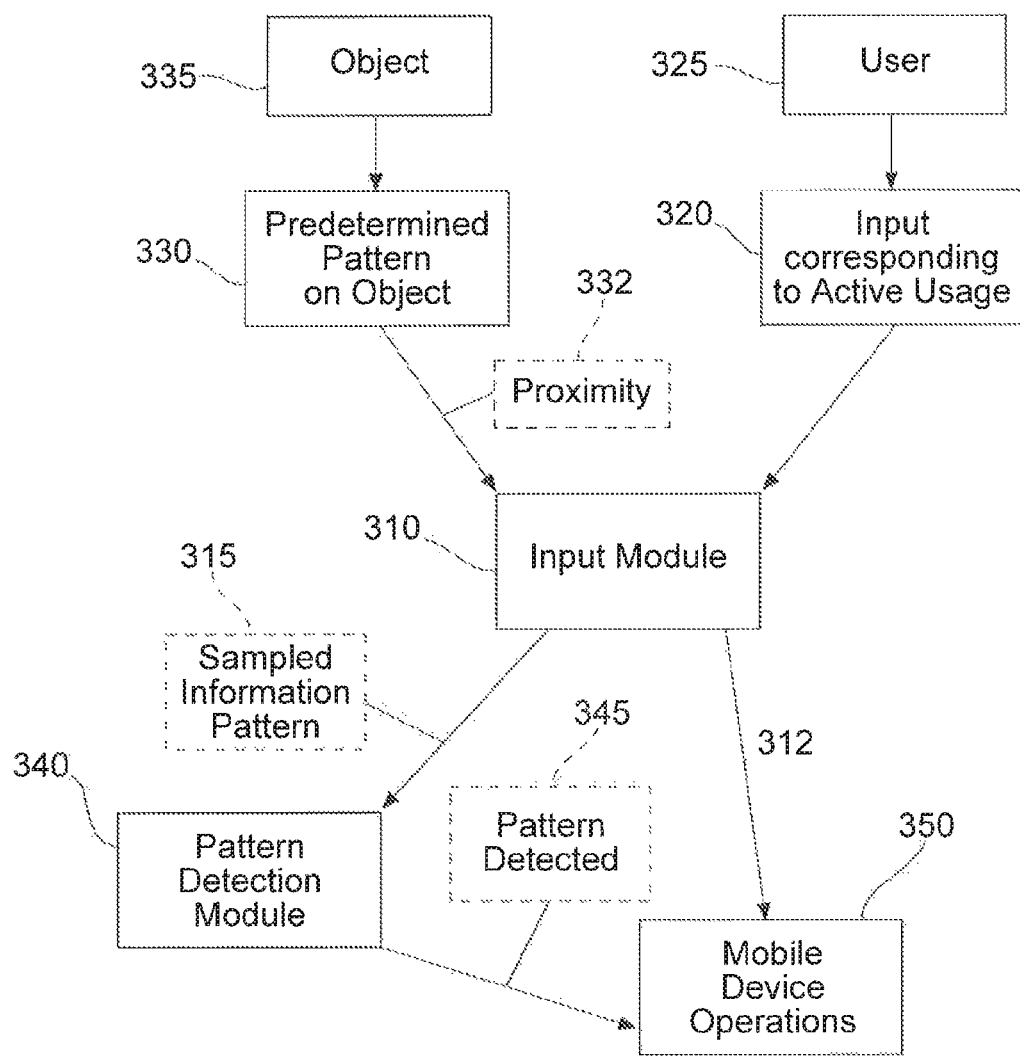
FIG. 3 illustrates a flow of information in accordance with embodiments of the present technology.

FIG. 3 illustrates a flow of information in accordance with embodiments of the present technology. An input module 310 is configured to receive input 320 corresponding to active usage of the mobile device, typically initiated by a user 325. The input module is further configured to receive input corresponding to a predetermined pattern 330 on a predetermined object or device 335, when the pattern 330 is proximate 332 to the input module 310. The input 320 corresponding to active usage is passed for use in mobile device operations 350. Input is also provided by the input module as a sampled information pattern 315. The information pattern 315 is processed by a pattern detection module 340. If the information pattern 315 matches a predetermined pattern, for example due to the pattern 330 being proximate to the input module 310, then the pattern detection module 340 has detected a pattern 345, and this event is passed to influence mobile device operations 350.

Input Module

Embodiments of the present technology comprise or relate to an input module of a mobile device. An input module may be, for example, a touch surface such as a capacitive or resistive touch screen or touch pad, an optical navigation module, a set of buttons, a keypad, a camera, or the like, or a combination thereof.

Input modules of this type are typically provided on mobile devices primarily for acquiring input corresponding to active usage of the mobile device. For example, input modules may be configured to discern gestures, key presses, finger movements, or the like, which are processed by the mobile device and interpreted as user input for directing functionality, as would be readily understood by a worker skilled in the art. Input modules such as cameras may be configured simply to acquire and store input such as images, without necessarily associating that input with particular functionality.

The input module is configured to generate signals, such as processed or unprocessed digital or analog electrical signals or combination thereof, indicative of appropriate input presented thereto. For example, a touch surface may generate signals indicative of the location of one or more regions of the screen being touched. As another example, an optical module such as a camera or optical navigation module may generate signals indicative of patterns of light, such as light reflected off of a user's hand or finger, striking the sensor elements of the optical module. Such signals may be further processed, by the input module or other processing components, for example to generate signals indicative of finger movements, hand gestures, noise-filtered signals, signals indicative of mouse pointer location or displacement, and the like, as would be readily understood by a worker skilled in the art.

In some embodiments, filtering, averaging, and the like may be used in part for providing useful signals corresponding to active usage of the mobile device, such as touch-based user input. However, such filtering may potentially undesirably distort or obscure features on size scales corresponding to the non-naturally occurring patterns described herein. For example, input modules may use spatial oversampling to improve tracking of finger movements or other user inputs, and averaging or aggregation of the oversampled data may obscure features of a sufficiently fine-pitched pattern. In embodiments of the present technology, a relatively unfiltered, or at least differently filtered, version of the input module signals may be used for purposes of detecting non-naturally occurring patterns, and a fully filtered version may be used for providing signals corresponding to active usage.

In accordance with embodiments of the present technology, the input module is capable of discerning input corresponding to a range of predetermined patterns. Such a range may include both naturally occurring and non-naturally occurring patterns. Naturally occurring patterns are those that are typically encountered during active usage of the mobile device, while non-naturally occurring patterns are those which would not typically occur during active usage. Conversely, the non-naturally occurring patterns used in the present technology may be configured to be discernable using capabilities of predetermined input modules. Discerning the input may comprise receiving the input to a sufficient degree or resolution or both to support adequately differentiating the input corresponding to one pattern from other input corresponding to other naturally occurring patterns or non-naturally occurring patterns. Actual detection of occurrence of the pattern need not be performed by the input module. Rather, the input module need only gather and provide sufficient information to support detection. Operations related to detection of the pattern, such as signal processing operations, may be performed by a pattern detection module which may be separate from the input module, for example the pattern detection module may comprise a central processor of the mobile device.

Capacitive Touch Surface

In some embodiments, the input module is a capacitive touch surface, such as a touch screen or touch pad, having multi-touch capabilities. The touch surface may be a projected capacitive touch surface or surface-capacitive touch surface, for example. Such a touch surface may be capable of generating signals indicative of two or more locations on the touch surface which are being subjected to a capacitive disturbance, for example due to fingers or other conductive objects touching or almost touching the surface at those locations. The general operation of capacitive touch surfaces would be readily understood by a worker skilled in the art.

Objects that may cause a sufficient capacitive disturbance when proximate to the capacitive touch surface may include metal or other conductive strips, plates or objects, conductive foam, or the like. Objects having dielectric properties sufficiently different from the ambient dielectric near the touch surface may also be used. In some embodiments, the amount of capacitive disturbance may be increased by electrically coupling the object to a person, ground, virtual ground, source of electricity, or the like.

In embodiments of the present technology, such objects may be used to sufficiently disturb the capacitive touch surface when placed proximate thereto. The objects are configured to present a capacitive disturbance within the detection range of the touch surface, for example they may be configured to present a similar capacitive disturbance to a user's finger or stylus. Plural objects may be arranged in a discernable pattern, which may subsequently be recognized by the mobile device and used to trigger adjustment of an operating condition, as explained in more detail below.

Figure 4:
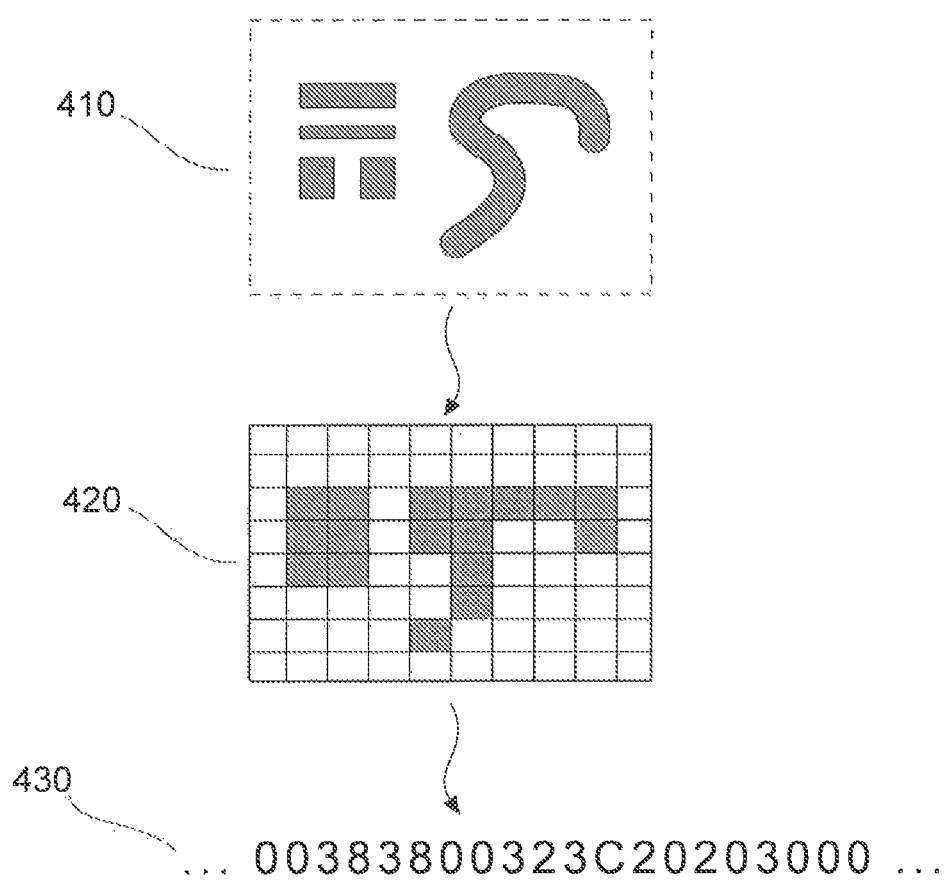
FIG. 4 illustrates an acquisition of a pattern by an input module, in accordance with embodiments of the present technology.

FIG. 4 illustrates the acquisition of a pattern 410 by an input module, in accordance with an embodiment of the present technology. The pattern 410 is provided within the input module field of view. The input module of this embodiment is capable of discerning the pattern 410 to a predetermined resolution as represented here by a rectangular grid. The input module thus discerns the pattern 410 as an approximate grid-based pattern 420, where shaded grid elements represent likely occurrence of pattern elements. For example, if the shaded portions of pattern 410 represent reflective elements on a relatively unreflective background, then the shaded portions of grid-based pattern 420 represent areas of relatively high reflection as discerned by the input module. By adjusting the grid resolution, the fidelity of the grid-based pattern 420 can be adjusted. The input module represents the discerned pattern 420 as a digital signal 430. For illustration, the digital signal 430 is shown as containing a hexadecimal representation of the grid-based pattern 420.

Optical Module

In some embodiments, the input module is an optical module, such as an optical navigation module or digital camera. For example, certain optical navigation modules may comprise what is essentially a digital camera which takes a sequence of images of a location at a sufficient sample rate and resolution to track motion of a finger or surface moving past the location. The location may further be illuminated by an LED or LASER to aid in imaging. An optical mouse may be considered as including a type of optical navigation module, however for mobile devices the optical navigation module is more typically fixed to the mobile device body, and used by moving one's finger or other object over the imaging location. Although optical navigation modules are typically configured to output signals indicative of motion, they typically detect such motion by comparing sequences of images. For purposes of pattern detection in the present technology, images of the location may be accessed and processed without necessarily attempting to detect a motion component.

In some embodiments, an optical module may be configured to differentiate between different wavelengths or colours of incident light, for example in visible or non-visible spectra or both. For example, in an optical navigation module, the imaging location may be illuminated in sequence with different colours of light, the optical sensors thereby receiving different images for each colour. Since a coloured object reflects incident light of certain colours more than others, the colour of an object may thus be detected to at least a certain degree by comparing sensor images corresponding to different illumination colours. A digital camera is also capable of capturing colour images, as would be readily understood by a worker skilled in the art. A non-naturally occurring pattern may thus be differentiated, at least in part, by its colour or pattern of colours. For example, a non-naturally occurring pattern may be formed using infrared reflective material.

Mechanical Input Modules

Embodiments of the present technology may comprise or relate to a mechanical input module, such as a resistive touch surface, set of push-buttons, or keypad. Such input modules are responsive to mechanical pressure to generate input signals. For example, a resistive touch surface may generate signals indicative of one or more locations on the surface that have been subjected to sufficient pressure, for example due to a finger press, or due to other mechanical pressure from protrusions constructed of resilient foam, resin, plastic, metal, or the like.

Pattern

Embodiments of the technology comprise or relate to a pattern, the pattern associated with a predetermined object and discernable by an appropriate input module of a mobile device.

In embodiments wherein the input module is a capacitive touch surface, an object or collection of objects may be shaped and/or arranged to present a spatial pattern of capacitive disturbance which is adequately discernable by the touch surface.

For example, the pattern may be a spatial pattern of objects, such as conductive objects or other objects with dielectric properties sufficiently different from the ambient dielectric properties, which, when placed proximate to the touch surface, are configured to disturb the electric field of elements of the capacitive touch surface to a sufficient degree so as to be registered by the touch surface, and in a pattern which is discernable by the touch surface. The sufficiency threshold for disturbance may depend on the sensitivity of the touch surface being used. The sensitivity may be a factor relating to design or adjustable settings or both.

In some cases, depending on touch surface sensitivity, an electrically "floating" pattern object of at least a predetermined size may be sufficient to disturb the electric field to a detectable degree. In some cases, pattern objects may be electrically connected to increase their collective capacity to disturb the electric field, or to present discernable patterns of electrical paths or both between pairs or groups of pattern objects proximate to the touch surface. In some cases, pattern objects may be electrically connected to a human body, to ground, to a conductive body of sufficient size to operate as a virtual ground, or to a power source such as a battery, thereby increasing the capacity of the pattern objects to disturb the electric field. In some embodiments, the relevant capacity to disturb the electric field is characterized by the capacity of the object to absorb current at a predetermined frequency, such as the driving frequency of the capacitive touch surface.

In embodiments wherein the input module is an optical module, an object or collection of objects may be shaped or arranged or both to present a spatial pattern of optical features which is adequately discernable by the optical module when positioned appropriately. Each pattern object may be an opaque object, which may be configured to reflect light in one or more spectral ranges. For example, pattern objects may be infrared reflectors or reflectors of visible light. Appropriate positioning of the pattern may include placing the pattern within the field of view of the optical module and at an appropriate distance therefrom.

In embodiments wherein the input module is a mechanical input module, the pattern may be a spatial pattern of protrusions constructed of resilient foam, resin, plastic, metal, or the like. The protrusions may be patterned on a surface such as the interior of a mobile device holster, such that, when the mobile device is inserted into the holster or placed on or moved across the relevant surface, the pattern actuates the mechanical input module or modules, thereby facilitating discernment of the pattern. When the mechanical input module comprises buttons or keys, care may need to be taken to ensure adequate alignment of the patterned protrusions with the input module.

In embodiments of the present technology, a pattern is a non-naturally occurring pattern. That is, the pattern is configured so that it is substantially different from patterns presented to the input module during active usage of the mobile device. This difference may be due to pattern size, pattern feature size, pattern shape, dispersal of the pattern over the input module's field of view, degree or type of stimulation of the input module, colour, or a combination thereof, or the like. The use of non-naturally occurring patterns for triggering an adjustment in operating condition of the mobile device may avoid undesirably triggering such an adjustment during active usage. In some embodiments, the more distinct a predetermined trigger pattern is from patterns corresponding to normal user input, the less likely an undesirable triggering of the operating condition adjustment will be.

In some embodiments, the pattern is associated with a portion of a distinct predetermined object or device, such as an office desk, coffee table, charging pad, mouse pad, distinctive pocket liner, or the like. Although such patterns are necessarily present in the world, they are not, for the purposes of this disclosure, considered naturally occurring, since they are substantially unique to the distinct object or device. If such patterns are available and adequately distinct, they may be used in place of artificially produced patterns. For example, a mobile device can be configured to "learn" or capture a substantially unique pattern present on the surface of an office desk or other object, and subsequently trigger an adjustment in operating condition based on detection of this pattern. Such embodiments may be especially applicable when the input module is an optical module such as a camera or optical navigation module.

In embodiments of the present technology, a pattern is sized appropriately to fit substantially within the field of view of the input module. This facilitates discernment of the pattern by the input module by allowing the entire pattern to be presented at a single time.

In embodiments of the present technology, a pattern may be repeated, for example by tiling the pattern over a region. The pattern may be repeated with or without overlaps or gaps between pattern instances. Thus, the pattern may be presented to the input module whenever a portion of the region is presented to the input module.

In some embodiments, the pattern is repeated over a region, and sized such that more than one iteration of the pattern occurs in the input module's field of view. In this manner, presentation of the pattern to the input module can be made robust to alignment errors, since at least one copy of the pattern is presented to the input module regardless what portion of the region is within the input module's field of view.

In some embodiments, the pattern is repeated over a region, for example by tiling, the pattern being recognizable even if an instance thereof is not entirely within the input module's field of view. For example, if a portion of the pattern's right side falls out of the field of view, but that portion is present elsewhere within the field of view, the pattern may be declared as detected.

As an illustrative example, if the pattern is repeated an integer number of times horizontally and vertically in a rectangular field of view, this may be performed by considering the field of view as a torus, with the top and bottom edges of the field of view "stitched" together and the right and left edges also stitched together. The pattern is then detected if it appears anywhere on the torus.

In some embodiments, the pattern is configured to be presented to the input module dynamically. For example, the pattern may be placed on the surface of a holster, with different portions of the pattern being presented to the input module as the mobile device is slid in or out of the holster. The mobile device may thus be configured to detect full insertion into the holster when the entire pattern revealed in one or both of an appropriate sequence, or to detect partial insertion into the holster when a portion of the pattern, that is a sub-pattern, is revealed due to the sliding motion.

In some embodiments, different patterns may be placed at different locations on a holster or other object. The different patterns may or may not be regarded as parts of a larger pattern. In some embodiments, different patterns may be located in different areas of a holster so that the a different pattern is presented to the input module for each of a plurality of levels of insertion of the mobile device into the holster. For example, when a mobile device is inserted half way into the holster, a first pattern may be presented, triggering a first response, and when the mobile device is inserted fully into the holster, a second pattern may be presented, triggering a second response.

As another example, the pattern may comprise active elements, such as powered electrical elements or illuminated optical elements, which may be time-varying so as to present the pattern dynamically. For example, in the case of a capacitive touch surface, the amount of current flowing to or from pattern objects may be varied in time by an electric circuit, thereby disturbing the electric field of the touch surface in a time-varying manner. Such time variation may comprise or be applied to part or all of the pattern.

Embodiments of the present technology may be configured to equate detection of a predetermined class of patterns with detection of a predetermined "seed" pattern. For example, the seed pattern may be tiled over a region, and detection of the predetermined class may correspond to detection of a portion of the tiled region which is adequate enough to contain substantially all portions of the seed pattern. The pattern class may include instances where substantially all portions of the seed pattern are present in an intact copy of the pattern. The pattern class may include instances where substantially all portions of the seed pattern are present but in different tiled copies of the pattern. The pattern class may include instances corresponding to different horizontal or vertical displacements or both of the pattern or portions thereof. Thus, embodiments of the present technology may be configured to detect a pattern in a tiling, regardless of how the tiling is displaced horizontally or vertically or both in the field of view. Patterns in the predetermined class may additionally or alternatively correspond to the "seed" pattern or tiled region being rotated within the field of view. In some embodiments, the pattern may be configured so that all members of the class inherit a particular set of one or more characteristics, thus simplifying the problem of detecting the class to detecting occurrence of those characteristics. In some embodiments, the size of the class can be managed by configuring the pattern with certain symmetries, such as rotational symmetries or other symmetries. Various processing methods as known in the art may be used to detect a pattern subjected to arbitrary displacements, rotations and other transformations within the field of view.

In embodiments of the present technology, characterizing features of a pattern are sized and spaced apart so as to be discernable by the input module. The appropriate feature size and spacing typically depends on factors such as the resolving power, resolution, or pixel density or combination thereof, of a given input module.

For example, if an input module, when exposed to a patterned surface placed at a predetermined distance, such as a few millimeters, is capable of distinguishing separate features on the patterned surface as long as those separate features have dimensions on the order of 0.1 mm and are placed no less than 0.1 mm apart, then the appropriate feature size and spacing in a pattern is about 0.1 mm. As another example, if an input module, when exposed to a patterned surface placed a few millimeters distant, is capable of representing the surface to which it is exposed as a digital image of 20 pixels by 20 pixels over a 1 $mm^2$ field of view, then the pattern features should be of linear size and spacing no less than about 0.05 mm.

There may be inherent trade-offs between one or more of the above considerations. For example, patterns with larger features may be more easily and reliably discerned by an input module of a given resolution. However, adding smaller features to patterns may facilitate providing a larger variety of patterns, which may increase the amount of information conveyed by a pattern, improve the capability for creating non-naturally occurring and substantially distinct patterns, and the like. Smaller pattern features may also allow for smaller overall patterns, which may facilitate detection in the face of alignment errors, as described above.

Therefore, in embodiments of the present technology, the pattern feature size is selected so as to be reliably discerned by the appropriate input module, possibly accounting for a predetermined amount of noise, while also allowing the pattern to be substantially differentiated from other relevant patterns, at least within a predetermined error tolerance level.

Figure 5A:
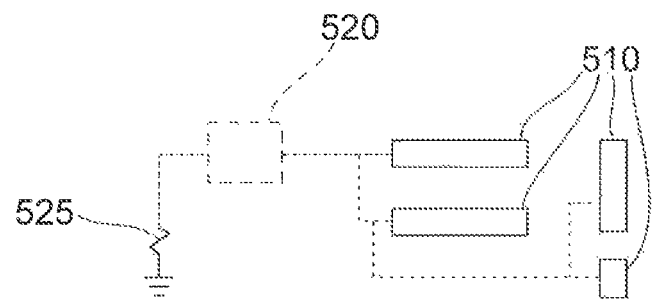
FIG. 5A illustrates a pattern of capacitive objects for presentation to a capacitive touch screen in accordance with embodiments of the present technology.

FIG. 5A illustrates a pattern of capacitive objects 510 for presentation to a capacitive touch screen in accordance with embodiments of the present technology. In some embodiments, the capacitive objects 510 may be coupled to an electrical system 520, which may be grounded 525 or connected to a power supply or both. The pattern of objects 510 may be repeated in a tiled manner.

Figure 5B:
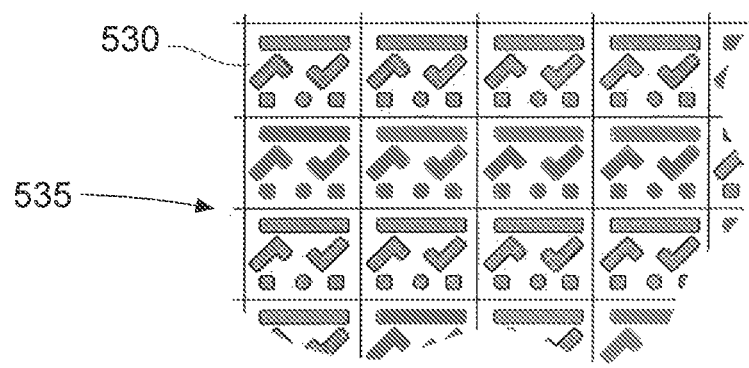
FIG. 5B illustrates a pattern of optically reflective objects for presentation to an optical navigation module in accordance with embodiments of the present technology.

FIG. 5B illustrates a pattern of optically reflective objects 530 for presentation to an optical navigation module accordance with embodiments of the present technology. The objects 530 may be formed into a pattern which is repeated in a tiled manner 535. The tiling 535 may be of a desired size and shape.

Figure 5C:
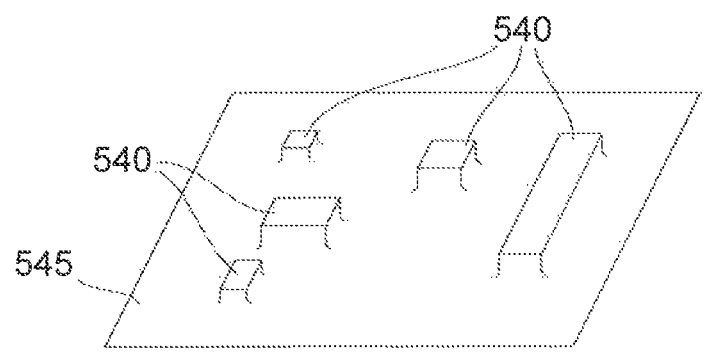
FIG. 5C illustrates a pattern of protrusions for contact presentation to a mechanical input module in accordance with embodiments of the present technology.

FIG. 5C illustrates a pattern of protrusion objects 540 for presentation to a mechanical input module in accordance with embodiments of the present technology. The protrusion objects 540 represent bumps of different shapes and sizes protruding from a support surface 545.

Pattern Detection

Embodiments of the present technology relate to pattern detection, for example via a pattern detection module, part of a method, or computer program product. Pattern detection comprises detection of one or more predetermined patterns, such as non-naturally occurring patterns, being presented to the input module, based on signals generated by the input module. Once a predetermined pattern has been detected, an operating condition of the mobile device may be adjusted.

Pattern detection operates on signals generated by an input module. Therefore, pattern detection may comprise detecting information patterns within those signals, rather than directly detecting physical patterns. However, as the input module is configured to generate signals which are at least in part a representation, such as a digital representation, of a physical pattern discernable by the input module, there is a predetermined correspondence between the signal's information patterns and the physical patterns.

In embodiments of the present technology, a pattern detection module is provided in a mobile device and is operatively coupled to the input module to receive signals therefrom. The pattern detection module may comprise a processor operatively coupled to memory and input/output lines. The pattern detection module may be implemented using general-purpose hardware, for example the central processing unit and shared memory of the mobile device. The pattern detection module may also be implemented using its own dedicated hardware, such as comprising one or more of: a microprocessor or microcontroller, RAM, ROM, interface electronics, and the like. In some embodiments, the pattern detection module and the input module are implemented at least in part in shared hardware. For example, a microprocessor may receive and process signals from input module sensors as part of implementation of the input module, and also perform pattern detection associated with the pattern detection module.

Embodiments of the present technology can detect input corresponding to a predetermined pattern and, based on such detection, adjust operation of the mobile device. The predetermined pattern may be a single pattern, a pattern falling within a predetermined range of patterns, or a pattern satisfying one or more predetermined parameters. The predetermined pattern may be a non-naturally occurring pattern.

In some embodiments, pattern detection may be configured to detect occurrence of a pattern even if it is displaced or rotated within the field of view, viewed at an angle, or if the surface containing the pattern is bent or wrinkled up to a predetermined degree. Furthermore, if the pattern is repeated, for example tiled on the surface, pattern detection may be configured to detect occurrence of the pattern from plural separate portions of the pattern. If there are time-varying aspects to the pattern, the pattern detection module may further be configured to analyze dynamics in the input module signals to facilitate detection. Various appropriate algorithms, such as spatial pattern matching algorithms, for detecting such patterns in the presence of such distortions, or in the presence of other background noise such as ambient optical or electrical signals, sensor imperfections, or the like, would be readily understood by a worker skilled in the art.

In some embodiments, aspects of the present technology are configured to facilitate reliable pattern detection even when the pattern is moving relative to the input module. For example, the input module may be configured to scan its input at an adequately high rate to avoid motion blur when the pattern is in motion at less than a predetermined maximum speed. Other approaches may include the use of signal processing algorithms to compensate for motion blur, use of suitably sized and shaped patterns which may be easily detected even under predetermined relative motion, or the like, or a combination thereof.

For example, in some embodiments, signals received from the input module may be processed to obtain a sampled information pattern contained therein, the sampled information pattern corresponding to a spatial pattern detected by the input module. The sampled information pattern may be compared to one or more information patterns stored in memory to determine if there is a match. A match may occur if the sampled information pattern sufficiently corresponds to a stored information pattern or portion thereof, accounting for one or more factors such as: noise, distortions due to field of view misalignment such as rotations, translations or tilting, distortions due to pattern surface folding, colour mismatches, lighting conditions, movement, jitter, or the like, or a combination thereof.

Pattern detection operations performed on a mobile device may be performed intermittently at a predetermined frequency, or substantially continuously. The latency or delay between presentation of a predetermined pattern to the input module and pattern detection may be configured based on performance requirements. However, it should be noted that lower delay may require use of more resources such as processor time and battery power, as well as potentially requiring more powerful and thus more expensive hardware.

In some embodiments, the present technology may be configured to detect a pattern within a fraction of a second of pattern presentation. This may be desirable for example to avoid registering inadvertent key presses or other input as the mobile device is being placed in a holster or other holder or container. In some embodiments, the present technology may be configured to detect a pattern within several seconds or even tens of seconds or minutes of pattern presentation. In some embodiments, resources dedicated to pattern detection may be variable. For example, when the mobile device is in active use, pattern detection operations may be suspended or performed at a lower frequency than when the mobile device is not in active use.

Response to Pattern Detection

In embodiments of the present technology, an operating condition of the mobile device is adjusted upon detection of a predetermined pattern. Adjustment of the operating condition may occur immediately after detection or after a predetermined delay or in conjunction with other conditions being satisfied.

Adjusting the operating condition may comprise entering a powered down "sleep" mode, entering a reduced functionality mode, suppressing input signals from one or more input modules from having their normal effect on the mobile device, changing or resetting user interface characteristics of the mobile device, changing how the mobile device responds to incoming communications or other events, or the like, or a combination thereof.

In some embodiments, adjusting the operating condition comprises suppression of at least some signals from one or more input modules of the mobile device, such as touch surfaces, buttons, keys, optical navigation modules, and the like. In this way, inadvertent input events, such as key presses, which may occur during or after insertion of a mobile device into a holster or other container, or onto a predetermined surface, or the like, may be inhibited from triggering undesired functions, such as making a call or performing another operation that may unnecessarily consume battery power. One or more input modules may still be configured to accept at least one predetermined input "unlock" sequence so that the mobile device can be returned to a normal operating condition by the user.

In some embodiments, input modules of a mobile device may be locked upon presentation of the predetermined pattern, and may only be unlocked by entering a security code. This may facilitate automatic securing of the device when it is presented with the predetermined pattern.

In some embodiments, adjusting the operating condition comprises disabling at least some functionality of the mobile device. For example, this may allow the mobile device to operate in a reduced power mode when appropriate, thereby prolonging battery life. For example, when the mobile device is inserted into a holster, pocket, placed on a predetermined surface, or the like, certain functions such as lights, display screens, and the like, may be turned off or dimmed. Communication operations of a communication-enabled mobile device may be unaffected, disabled, or operated at a reduced capacity or intermittently, in various embodiments. Power saving features may be preconfigured or user-configurable.

In some embodiments, after the operating condition has shifted in response to pattern detection, the mobile device is configured to continuously or intermittently check whether the predetermined pattern is still being presented to the input module. If, for example, the pattern is no longer detected, the mobile device may revert to a previous operating condition, or shift to another operating condition. For example, such a mobile device may thereby automatically detect its removal from a holster, and subsequently enter a full-power mode or an operational mode with all input modules fully enabled.

In embodiments of the present technology, adjustment of the operating condition may have other effects. In some embodiments, adjusting the operating condition comprises personalization of the mobile device, adjusting operating features of the mobile device, or the like. For example, upon detection of a predetermined pattern associated with a particular user, the mobile device may automatically personalize to that user's preferences. As another example, upon detection of a predetermined pattern associated with a particular environment, such as a home or office, the mobile device may automatically adjust to appropriate settings for that environment, such as wallpaper, ringtones, and the like. As another example, upon detection of a predetermined pattern found on a mouse pad, the mobile device can adjust to function as a Bluetooth™ or other wireless mouse. As yet another example, upon detection of a predetermined pattern associated with a mobile device holster, ring settings of a communication-enabled mobile device may be adjusted, for example to enable a vibrate mode, increase ring volume, or the like.

Mobile Device

Embodiments of the present technology comprise or relate to a mobile device having an input module and configured to detect presentation of a predetermined pattern via the input module and a pattern detection module, and to respond to such detection in a predetermined manner. In embodiments of the present technology, the mobile device is a wireless communication device, hand-held electronic device, PDA, handheld game system, digital camera, digital organizer, or the like.

Functionality of the mobile device may be implemented using standard or special-purpose hardware, such as input device hardware, microprocessors, volatile or non-volatile memory or both, user interface hardware, and the like. In some embodiments, the present technology may be implemented on a substantially standard mobile device by loading and executing a computer program thereon and/or by configuring software or firmware of the mobile device. In some embodiments, the mobile device may be provided with hardware such as input devices and processing devices which are configured at least in part to support the present technology.

In embodiments of the present technology, the mobile device may be wireless communications device having appropriate communication capabilities, such as voice communication capabilities, data communication capabilities, or a combination thereof. The term "wireless communication device", for the purposes of this specification, shall include any wireless handheld, smart phone, PDA, tablet, laptop, netbook, or other communications device that is capable of transmission and reception of data via a wireless communication medium such as radio.

Figure 6:
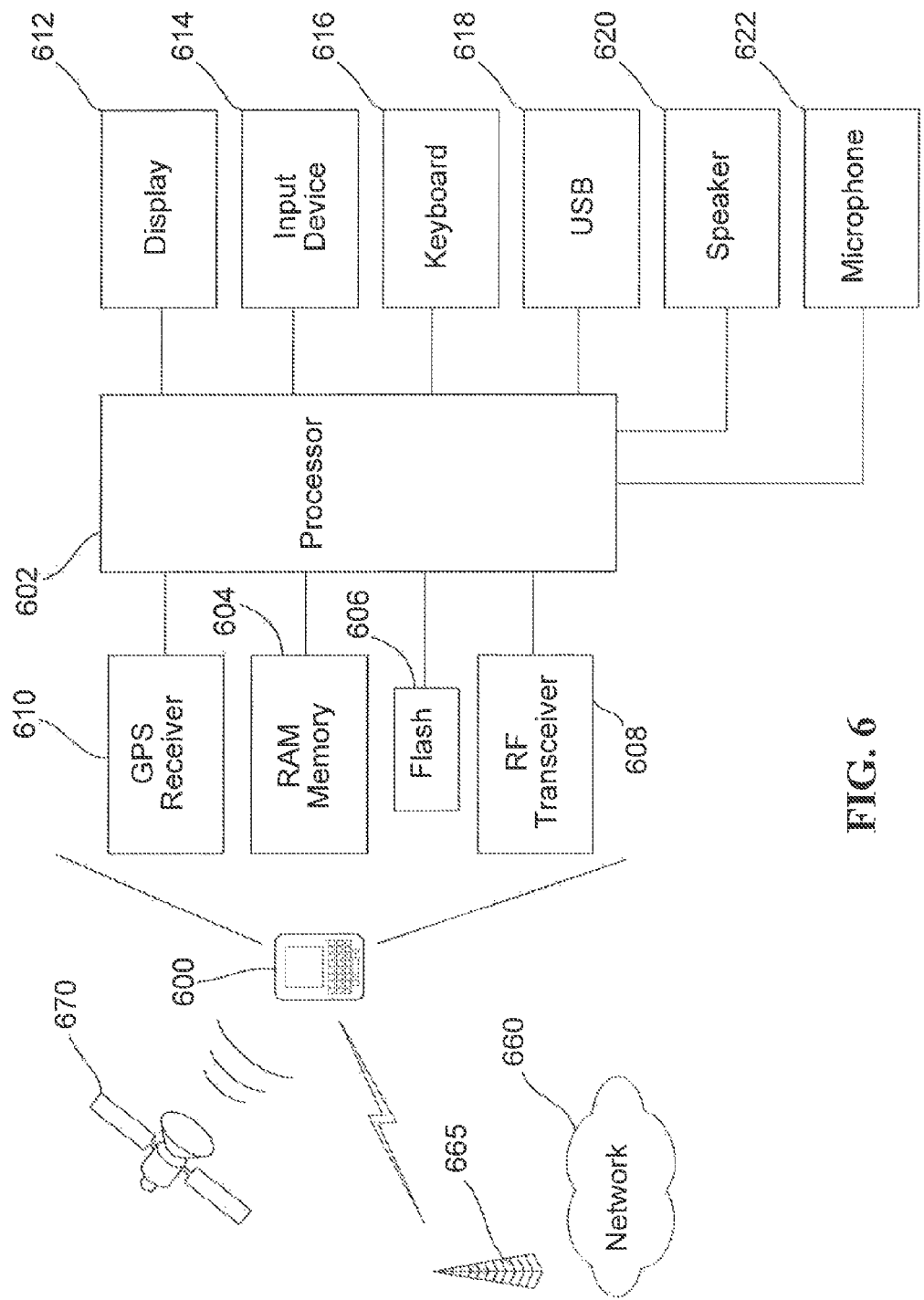
FIG. 6 is a block diagram depicting certain main components of an exemplary wireless communication device.

FIG. 6 is a block diagram depicting certain main components of an exemplary wireless communication device 600. It should be understood that this figure is intentionally simplified to show only certain components; the device 600 may include other components beyond those shown in FIG. 6. The device 600 includes a microprocessor 602 (or simply a "processor") which interacts with memory in the form of RAM 604 and flash memory 606 to enable a variety of device functions and to execute an operating system for running software applications loaded on the device. The device 600 includes a radiofrequency (RF) transceiver 608 for communicating wirelessly with a base station 665 of a wireless network 660, or alternatively or additionally for communicating directly with another peer device such as a wireless communication device, for example as may occur in some ad-hoc networks. The base station 665 may be a cellular base station, wireless access point, or the like. The base station 665 may change as the wireless communication device travels. The RF transceiver includes a wireless communication channel for transmitting and receiving data. The RF transceiver may further include a wireless voice channel for transmitting and receiving voice communications, for example concurrently with transmission and reception of data over the same or a separate logical or physical channel.

The device 600 optionally includes a GPS receiver chipset 610 for receiving GPS radio signals transmitted from one or more orbiting GPS satellites 670. The GPS receiver chipset 610 can be embedded within the device or externally connected, such as, for example, a "Bluetooth" GPS puck or dongle. Other positioning systems may also be used in place of GPS, as would be readily understood by a worker skilled in the art.

In terms of input/output devices or user interfaces (UI's), the device 600 typically includes a display 612 (e.g. a small LCD screen), a thumbwheel or trackball 614, an optical navigation module, a keyboard 616, which in some embodiments may be integrated or enabled using the display such as a touch screen display, a USB 618 or serial port for connecting to peripheral equipment, a speaker 620 and a microphone 622. The device's display 612 may optionally include a touch screen input device.

The wireless communication device 600 sends and receives communication signals via the RF transceiver 608.

When communicating wirelessly with a base station 665 of a wireless network 660, the device 600 may communicate in accordance with one or more appropriate technologies such as: Global Systems for Mobile communications (GSM), General Packet Radio Service (GPRS), Code Division Multiple Access (CDMA) technologies, Wideband CDMA (WCDMA), whether 2G, 3G, High speed packet access (HSPA), Universal Mobile Telecommunication System (UMTS) based technologies, Long Term Evolution (LTE) technologies, Orthogonal Frequency Division Multiplexing (OFDM) technologies, Ultra-Wideband (UWB) technologies, WiFi or WiMAX technologies, or other communication technologies and protocols as would readily be understood by a worker skilled in the art. In some embodiments, the wireless device 600 may be capable of operation using multiple protocols. The base station 665 may be part of a wireless network, such as a cellular network, local-area network, wide-area network, wireless hotspot network, or the like. The wireless communication device, base station, network components, and the like, may be configured for data communication, voice communication, or a combination thereof, possibly using additional components, configurations and procedures where appropriate, such as SIM cards, authorization and authentication procedures, handoff procedures, and the like, as would be readily understood by a worker skilled in the art.

Object or Device Associated with Mobile Device

Embodiments of the present technology comprise or relate to an object or device associated with the mobile device, such as a holder, case, bag, pocket, container or holster, into which the mobile device may be inserted for storage, or a surface upon which the mobile device may be placed, or the like. An object or device may be associated with the mobile device in that it is physically proximate on a repeated basis. For example, a holster, pocket or charging cradle may be used regularly to store the mobile device, or a desk or other surface may be used regularly to hold the mobile device.

In embodiments of the present technology, a pattern, as described above, is placed on at least a portion of the surface of the object or device. The pattern may be applied as an adhesive sticker or decal, etching, or integrally formed in the surface during manufacture, for example. In some embodiments, the pattern may be a non-naturally occurring pattern designed explicitly for detection purposes. In some embodiments, the pattern may be a distinctive pattern inherent to the object or device, such as a woodgrain pattern, mouse pad pattern, pocket liner pattern, or the like, which is learned, captured or programmed into the mobile device.

Portions of the object or device holding the pattern should correspond to portions that are expected to be proximate to the mobile device input module. For example, an interior portion of a holster which lines up with the mobile device input module when the mobile device is inserted therein may have the pattern thereon. In some embodiments, the pattern can be applied over a substantial portion of the object, thereby allowing the object to present the pattern even if the mobile device is not precisely placed relative to the object, or allowing the object to be used with more than one type or model of mobile device with various form factors.

Figure 7A:
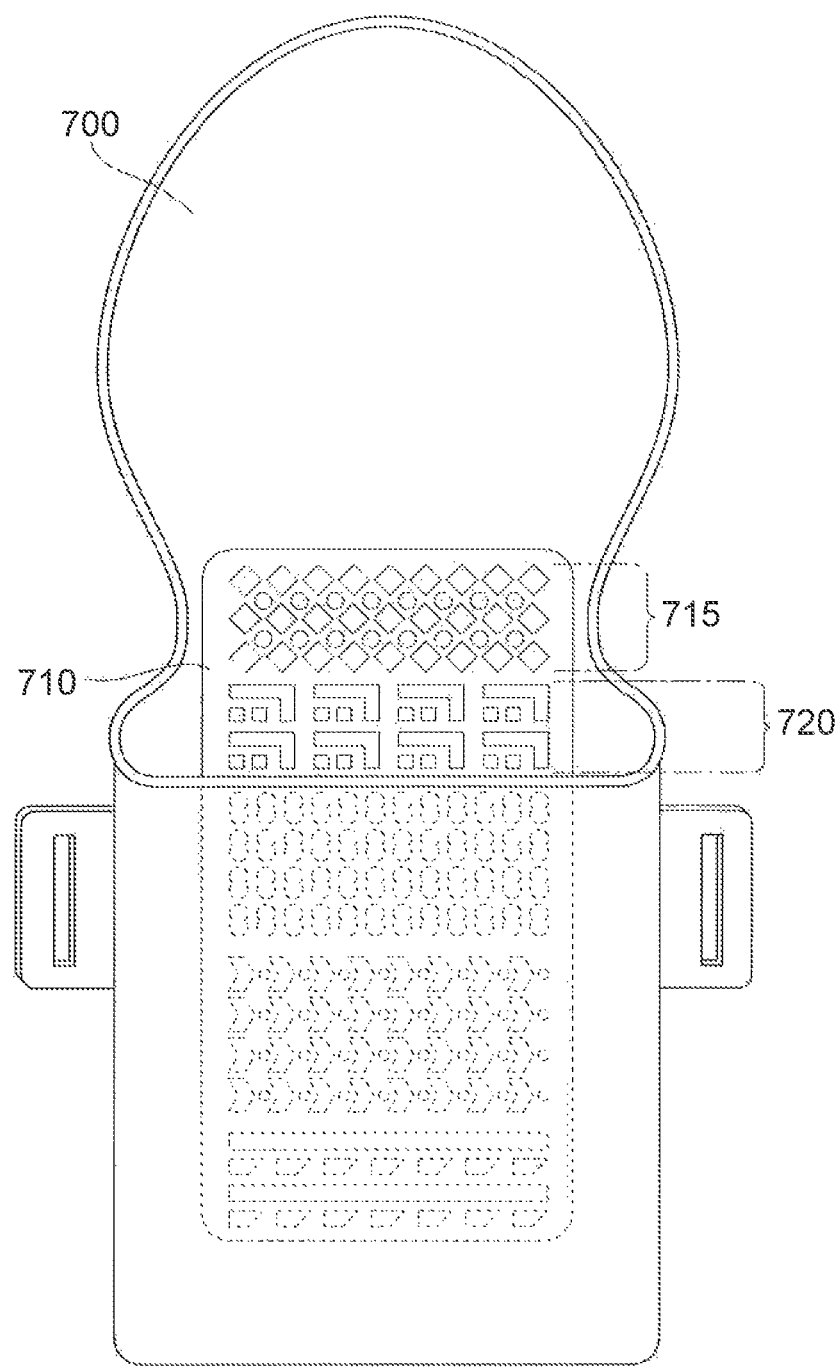
FIG. 7A illustrates a mobile device holster comprising a patterned surface in accordance with embodiments of the present technology.

FIG. 7A illustrates a mobile device holster 700 comprising a patterned surface 710 in accordance with embodiments of the present technology. The patterned surface 710 is placed on an interior wall of the holster so that at least a portion is proximate to an input module of a mobile device when the mobile device is holstered. A portion of the patterned surface 710 is shown in broken lines to indicate that it is hidden in an interior of the holster. In some embodiments, the patterned surface 710 contains the same pattern throughout. In some embodiments, the patterned surface 710 contains different patterns in different regions, for example regions 715 and 720. Thus presentation of the pattern can be dynamically varied as the mobile device is inserted or removed or both from the holster 700.

As illustrated, the holster 700 comprises a cavity for holding the mobile device, and the patterned surface 710 is positioned on an interior wall of the cavity. When the mobile device is inserted into the holster 700, the appropriate input module faces the patterned interior wall and the patterned surface 710 is thus presented to the input module. In some embodiments, the holster may comprise a top flap which can be folded over the opening through which the mobile device is inserted and affixed, for example by a snap or other means, to secure the mobile device once inserted. As illustrated, the region 715 of the patterned surface may cross over the folding line of the top flap, and may be flexible so as to fold with the top flap. Providing at least a portion of the pattern on the top flap may facilitate earlier pattern detection if the input module is placed proximate to the top flap before sliding insertion into the holster cavity. Alternatively the holster may comprise other means for retaining the mobile device within the holster.

Figure 7B:
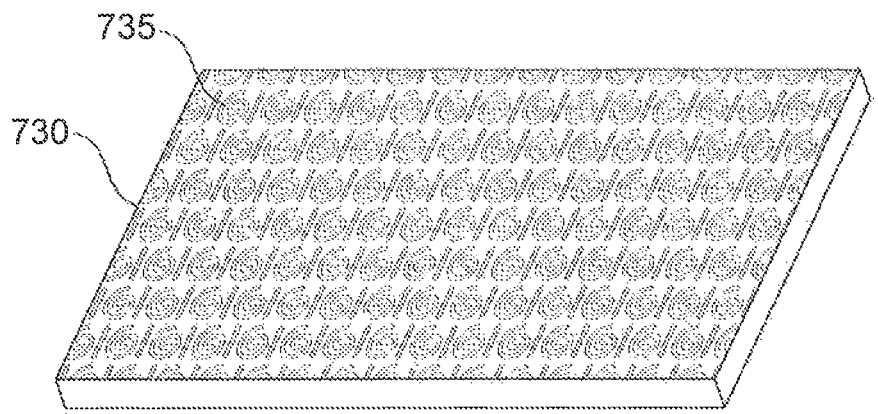
FIG. 7B illustrates a surface comprising a pattern thereon in accordance with embodiments of the present technology.

FIG. 7B illustrates a surface 730 comprising a pattern 735 thereon in accordance with embodiments of the present technology. For example, the surface 730 may be a desktop, tabletop, mousepad, charging surface, or the like. The pattern 735 may be provided on all or a portion of the surface 730, and may be a specially designed pattern or a pattern inherent to the surface 730.

Figure 7C:
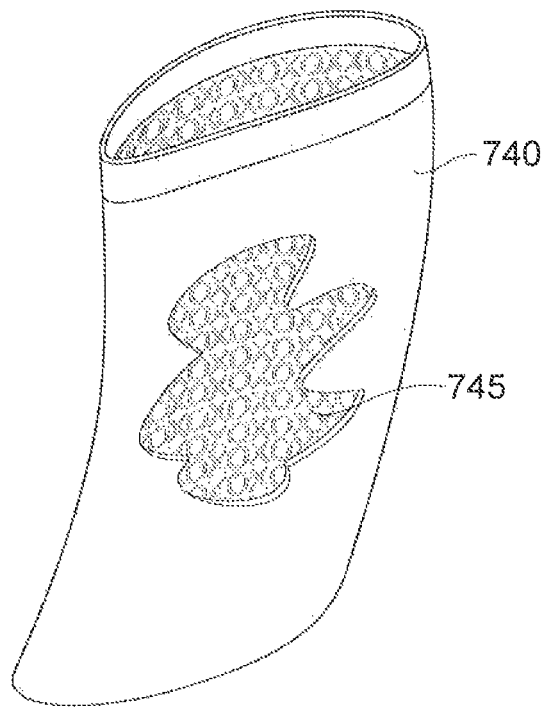
FIG. 7C illustrates a pouch comprising a patterned interior in accordance with embodiments of the present technology.

FIG. 7C illustrates a pouch 740 comprising a patterned interior 745 in accordance with embodiments of the present technology. The pouch 740 may be a flexible or semi-flexible case, a pocket of a piece of clothing, a pouch in a larger item such as a suitcase or backpack, or the like. The pattern 745 may be repeated over the whole of the interior surface, so that it is detectable by the mobile device even if the mobile device is placed substantially arbitrarily in the pouch 740. The pouch 740 is shown with a cutaway to illustrate patterning of the interior surface.

Implementations of the present technology will now be further explained with regard to the example scenarios. It should be expressly understood that these scenarios are only examples and are provided solely for the purposes of illustrating how the technology works in certain circumstances. Accordingly, these examples should not be construed as limiting any of the aspects of the technology already described above and claimed in the appended claims.

EXAMPLE 1

In one embodiment, the input module is a multi-touch capacitive touch screen capable of discerning plural inputs and correlating them to positions on an 18 by 12 grid. In some embodiments, for two simultaneous "touches" or input points, such a touch screen may be capable of discerning $(18*12)*((18*12)-1)/2=23220$ different input configurations. In some embodiments, the use of interpolation algorithms, as would be readily understood by a worker skilled in the art, may increase the number of locations detected per touch. For example, an 18 by 12 grid touch screen may be capable of discerning $480*360$ locations for one touch, and more than 23320 but less than $(480*360)*((480*360)-1)/2$ different input configurations for two simultaneous touches. Although many of these input configurations may correspond to naturally occurring input corresponding to active mobile device usage, some configurations may be discernable as non-naturally occurring inputs. Alternatively, some sequences of input configurations, or input configurations disturbing the touch screen to a non-naturally occurring magnitude, or input configurations comprising three or more input points, may be discernable as non-naturally occurring inputs. Alternatively, instead of corresponding to localized input "points", simultaneous "touches" may correspond to input areas with a predetermined shape, such as the shape of a rectangular or otherwise-shaped strip of metal placed proximate to the touch surface.

In one embodiment, the input module is a multi-touch capacitive touch screen capable of discerning plural inputs and correlating them to positions on an 18-point horizontal scale and a 12-point vertical scale. For each "touch" or input point, such a touch screen may be capable of discerning up to $(18*12)=216$ different input configurations. For two simultaneous input points, such a touch screen may be capable of discerning up to $(18*12)*(18*12-1)/4=11610$ different input configurations. Such a touch screen may be capable of discerning plural simultaneous touches, or the location of one touch plus the presence but not location of a second touch. As before, depending on how the mobile device is configured and used, some input configuration may be discernable as non-naturally occurring patterns and used for purposes of the present technology.

Although the multi-touch surface in the present example has been described with respect to its ability to discern one or two simultaneous stimuli, it is contemplated that a multi-touch surface may be capable of discerning more complex stimuli, for example due to non-naturally occurring "trigger" patterns of capacitive disturbances.

For example, each pattern of capacitive disturbances presented proximate to a multi-touch surface will result in a corresponding input condition to the multi-touch surface sensors. During active usage, it is typical to interpret such input conditions as one or more finger touch locations. However, for purposes of discerning a non-naturally occurring pattern, it is not always necessary to locate all of the capacitive elements making up the pattern. Rather, it may only be necessary to discern the overall input condition as being sufficiently different from other input conditions, for example corresponding to active usage or other "non-trigger" patterns. Interpolation algorithms and other detection algorithms may be configured and focused on discriminating certain features corresponding to a predetermined class of non-naturally occurring patterns, in order to facilitate discernment thereof.

Acts associated with the method described herein can be implemented as coded instructions in a computer program product. In other words, the computer program product is a computer-readable medium upon which software code is recorded to execute the method when the computer program product is loaded into memory and executed on the microprocessor of a computing device.

This new technology has been described in terms of specific implementations and configurations (and variants thereof) which are intended to be exemplary only. The scope of the exclusive right sought by the applicant is therefore intended to be limited solely by the appended claims.

The invention claimed is:

1. A mobile device comprising:
  a) an input module configured to discern input presented thereto and to produce signals indicative thereof, said input including a first type of input corresponding to active usage of the mobile device and a second type of input corresponding to a pattern presented by a predetermined object when the input module is proximately exposed thereto, wherein the predetermined object is inanimate: and wherein the predetermined object is configured to store the mobil device or the predetermined object includes a surface upon which the mobile device can be placed or both; and b) a pattern detection module operatively coupled to the input module, the pattern detection module configured to detect said pattern being presented to the input module, wherein the mobile device is configured to adjust an operating condition thereof based at least in part on detection of said pattern.

2. The mobile device according to claim 1, wherein the input module is an optical module, and the pattern is formed of one or more optically reflective elements.

3. The mobile device according to claim 1, wherein the input module is a capacitive touch surface, and wherein the pattern is formed of one or more dielectric objects detectable by the capacitive touch screen.

4. The mobile device according to claim 1, wherein the pattern detection module is configured to detect a static pattern or a dynamically varying pattern.

5. The mobile device according to claim 1, wherein the pattern is repeated over the predetermined object.

6. The mobile device according to claim 1, wherein the pattern is a non-naturally occurring pattern designed explicitly for detection purposes.

7. The mobile device according to claim 1, wherein the pattern is non-occurring during said active usage of the mobile device.

8. A device for physical association with a mobile device, the device comprising a pattern capable of being discerned by an input module of the mobile device when the input module is proximately exposed to the pattern, the pattern being discernibly different to the mobile device relative to said input corresponding to active usage thereof, thereby facilitating detection of the pattern by the mobile device, wherein the device is inanimate and; wherein the device is configured to store the mobile device or the device includes a surface upon which the mobile device can be placed or both.

9. The device according to claim 8, wherein the pattern is a non-naturally occurring pattern, said non-naturally occurring pattern being either inherent to the device or applied the device.

10. The device according to claim 9, wherein the non-naturally occurring pattern is designed explicitly for detection purposes.

11. The device according to claim 8, wherein the pattern is formed of one or more dielectric objects discernable by a capacitive touch surface input module, the device further comprising an electric circuit operatively coupled to at least one of said dielectric objects and configured to adjust discernability thereof.

12. The device according to claim 8, wherein the pattern is tiled over a predetermined region of the device.

13. The device according to claim 8, wherein the pattern is configured to fit within a field of view of the input module.

14. The device according to claim 8, wherein the pattern is configured to be presented to the input module dynamically.

15. The device according to claim 8, wherein the pattern is repeated over a predetermined region of the device.

16. The device according to claim 8, wherein the pattern is non-occurring during said active usage of the mobile device.

17. A device for physical association with a mobile device, the device comprising a pattern capable of being discerned by an input mudule of the mobile device when the input module is proximately exposed to the pattern, the pattern being discernibly different to the mobile device relative to said input corresponding to active usage thereof, thereby facilitating detection of the pattern by the mobile device, wherein the device is selected from the group comprising: a holder, a container, a holster, a pocket, a carry case, a support surface, a mouse pad, and a charging cradle.

18. A method of detecting proximity between an input module of a mobile device and a predetermined related object, the input module further configured for receiving a first type of input corresponding to active usage of the mobile device, the method comprising:

a) processing information generated by the input module to detect a predetermined information pattern, the information pattern corresponding to a predetermined physical pattern being presented proximate to the input module in accordance with a second type of input, the physical pattern associated with the related object, wherein the related object is inanimate and; wherein the related object is configured to store the mobile device or the related objected includes a surface upon which the mobile device can be placed or both; and b) adjusting an operating condition of the mobile device upon detection of said pattern.

19. The method according to claim 18, wherein adjusting the operating condition comprises one or more of: initiating a standby mode of the mobile device, suppressing input from input modules of the mobile device, personalizing the mobile device, and adjusting operating features of the mobile device.

20. The method according to claim 18, wherein detecting the information pattern comprises matching one or more aspects of the information generated by the input module to one or more stored aspects characteristic of the information pattern.

21. A computer program product for facilitating proximity detection of a mobile device input module to a related object, the input module further configured for receiving a first type of input corresponding to active usage of the mobile device, the computer program product comprising a non-transistory computer readable medium having recorded thereon code which, when loaded into memory and executed on a processor of the mobile device, is adapted to:

a) process information generated by the input module in order to detect a predetermined information pattern, the information pattern corresponding to a predetermined physical pattern being presented proximate to the input module in accordance with a second type of input, the physical pattern associated with the related object, wherein the related object is inaimate and; wherein the related object is configured to store the mobile device or the related objected includes a surface upon which the mobile device can be placed or both; and b) adjust an operating condition of the mobile device upon detection of said pattern.

* * * * *